(12) United States Patent
Fu

(10) Patent No.: US 9,554,078 B2
(45) Date of Patent: Jan. 24, 2017

(54) TELEVISION BASE AND FLATSCREEN TELEVISION

(71) Applicant: SHENZHEN TCL NEW TECHNOLOGY CO., LTD., Shenzhen, Guangdong (CN)

(72) Inventor: Guofeng Fu, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/022,611

(22) PCT Filed: Dec. 11, 2014

(86) PCT No.: PCT/CN2014/093601
§ 371 (c)(1),
(2) Date: Mar. 17, 2016

(87) PCT Pub. No.: WO2015/188600
PCT Pub. Date: Dec. 17, 2015

(65) Prior Publication Data
US 2016/0234457 A1    Aug. 11, 2016

(30) Foreign Application Priority Data

Jun. 12, 2014 (CN) .......................... 2014 2 0313709

(51) Int. Cl.
*F16M 11/00* (2006.01)
*H04N 5/64* (2006.01)
(Continued)

(52) U.S. Cl.
CPC .............. *H04N 5/64* (2013.01); *A47B 97/001* (2013.01); *F16M 11/04* (2013.01); *F16M 11/245* (2013.01);
(Continued)

(58) Field of Classification Search
CPC ........ F16M 13/02; F16M 11/20; F16M 11/40; F16M 11/04; F16M 11/245; H04N 5/64; A47B 97/001; A47B 2097/005
(Continued)

(56) References Cited

U.S. PATENT DOCUMENTS

| 6,988,698 B2 * | 1/2006 | O'Neill ................. F16M 11/04 248/323 |
| D602,514 S * | 10/2009 | Dittmer ....................... D16/235 |
| 2005/0161575 A1 * | 7/2005 | Friederich .............. F16M 11/04 248/519 |

FOREIGN PATENT DOCUMENTS

CN          203286238 U      11/2013

OTHER PUBLICATIONS

International Search Report of PCT Patent Application No. PCT/CN2014/093601 issued on Mar. 4, 2015.

* cited by examiner

Primary Examiner — Todd M Epps

(57) ABSTRACT

The application discloses a television base, comprising a supporting base fixedly connected with a television display screen and at least three supporting rods; the supporting base comprises rotating connection portions, the supporting rods are rotationally connected with the rotating connection portions, a surface of the supporting base provided with the rotating connection portions is located in a first plane, and the first plane is perpendicular to a plane where the television display screen is located; all the supporting rods relatively rotate around the supporting base in the first plane, when the supporting rods rotate to be opened, the supporting rods are positioned in the first plane to support a television shell; and when the supporting rods rotate to be folded, the (Continued)

supporting rods are positioned in the first plane and are perpendicular to the plane where the television displays screen is located.

20 Claims, 6 Drawing Sheets

(51) Int. Cl.
  *A47B 97/00*   (2006.01)
  *F16M 11/04*   (2006.01)
  *F16M 11/24*   (2006.01)
  *F16M 13/02*   (2006.01)

(52) U.S. Cl.
  CPC ......... *A47B 2097/005* (2013.01); *F16M 13/02* (2013.01); *F16M 2200/08* (2013.01)

(58) Field of Classification Search
  USPC .......... 248/163.1, 166, 165, 434, 188.6, 917
  See application file for complete search history.

TELEVISION BASE AND FLATSCREEN TELEVISION

BACKGROUND

Technical Field

The present application belongs to the technical field of manufacturing of televisions, in particular to a television base and a flatscreen television.

Related Art

Along with the development of society and the improvement of people's living standards, people have higher and higher requirements on performances of household appliances. A flatscreen television is a common household appliance, a base of the existing flatscreen television is usually fixedly connected with a main body of the flatscreen television, the shape of the base cannot be changed, and the space occupied by the base cannot be changed either. When a user needs to change the television from a seated manner to a hanging manner, the flatscreen television can be suspended only after the base is detached down, and great inconvenience is caused to the user.

Above content merely intends to assist in understanding of technical solutions of the present application and it is not acknowledged that above content is prior art.

SUMMARY

A main object of the present application is to provide a television base and a flatscreen television in the same inventive concept, aiming at improving convenience in use of a television base.

In order to realize the object, the application provides a television base, comprising a supporting base fixedly connected with a television display screen and at least three supporting rods; the supporting base comprises rotating connection portions, the supporting rods are rotationally connected with the rotating connection portions, a surface of the supporting base provided with the rotating connection portions is in a first plane, and the first plane is perpendicular to a plane where the television display screen is located;

all the supporting rods relatively rotate around the supporting base in the first plane, so that the supporting rods are in a rotary opening state or in a rotary folding state, when the supporting rods rotate to be opened, the supporting rods are positioned in the first plane to support a television shell; and when the supporting rods rotate to be folded, the supporting rods are positioned in the first plane and are perpendicular to the plane where the television displays screen is located.

Preferably, the supporting base comprises a supporting frame and a bottom plate, the supporting frame is positioned above the bottom plate, the supporting frame is fixedly connected with the bottom plate, one ends of the supporting rods connected with the supporting base are provided with through holes, the positions of the bottom plate corresponding to the through holes are provided with the rotating connection portions, and the rotating connection portions are fixing shafts arranged in the through holes.

Preferably, positions of the supporting frame facing one side of the bottom plate and corresponding to the fixing shafts are provided with fixing holes, and the fixing shafts penetrate through the through holes and are arranged in the fixing holes.

Preferably, the supporting rod comprises a strut and a connector, and the strut and the connector are in threaded connection.

Preferably, one end of the supporting rod connected with the supporting base is provided with teeth, and the teeth of two adjacent supporting rods may be meshed with each other.

Preferably, one end of the supporting rod connected with the supporting base is provided with teeth, and when the number of the supporting rods is four, the teeth of two adjacent supporting rods are meshed with each other.

Preferably, one end of the supporting rod connected with the supporting base is provided with teeth, and when the number of the supporting rods is three, the teeth of one supporting rod are meshed with the teeth of the other two supporting rods and the teeth of the other two supporting rods are separated.

Preferably, the television base further comprises a positioning pin, a supporting plate extends in a direction on the supporting frame toward the bottom plate, the supporting plate is provided with a mounting hole, and the positioning pin can extend between the two adjacent teeth through the mounting hole.

Preferably, the television base also comprises a foot pad for preventing sliding of the supporting rod, and the foot pad is arranged at one end of the supporting rod deviated from the connector.

Preferably, the supporting frame further comprises a connection portion for fixing a television shell, and the connection portion and the television shell are in threaded connection.

The present application further provides a flatscreen television, the flatscreen television comprises a television base, the television base comprises a supporting base fixedly connected with a television display screen and at least three supporting rods; the supporting base comprises rotating connection portions, the supporting rods are rotationally connected with the rotating connection portions, a surface of the supporting base provided with the rotating connection portions is in a first plane, and the first plane is perpendicular to a plane where the television display screen is located;

all the supporting rods relatively rotate around the supporting base in the first plane, so that the supporting rods are in a rotary opening state or in a rotary folding state, when the supporting rods rotate to be opened, the supporting rods are positioned in the first plane to support a television shell; and when the supporting rods rotate to be folded, the supporting rods are positioned in the first plane and are perpendicular to the plane where the television displays screen is located.

Preferably, the supporting base comprises a supporting frame and a bottom plate, the supporting frame is positioned above the bottom plate, the supporting frame is fixedly connected with the bottom plate, one ends of the supporting rods connected with the supporting base are provided with through holes, the positions of the bottom plate corresponding to the through holes are provided with the rotating connection portions, and the rotating connection portions are fixing shafts arranged in the through holes.

Preferably, positions of the supporting frame facing one side of the bottom plate and corresponding to the fixing shafts are provided with fixing holes, and the fixing shafts penetrate through the through holes and are arranged in the fixing holes.

Preferably, the supporting rod comprises a strut and a connector, and the strut and the connector are in threaded connection.

Preferably, one end of the supporting rod connected with the supporting base is provided with teeth, and when the number of the supporting rods is four, the teeth of two adjacent supporting rods are meshed with each other.

Preferably, one end of the supporting rod connected with the supporting base is provided with teeth, and when the number of the supporting rods is three, the teeth of one supporting rod are meshed with the teeth of the other two supporting rods and the teeth of the other two supporting rods are separated.

Preferably, the television base further comprises a positioning pin, a supporting plate extends in a direction on the supporting frame toward the bottom plate, the supporting plate is provided with a mounting hole, and the positioning pin can extend between the two adjacent teeth through the mounting hole.

Preferably, the television base also comprises a foot pad for preventing sliding of the supporting rod, and the foot pad is arranged at one end of the supporting rod deviated from the connector.

Preferably, the supporting frame further comprises a connection portion for fixing a television shell, and the connection portion and the television shell are in threaded connection.

According to the application, the supporting rods are arranged in a manner being capable of swinging relative to the supporting base, so that the plurality of supporting rods can be folded together, therefore, when a user needs to suspend the flatscreen television onto a wall, no detaching of the base is required, and it is favorable for the user to conveniently switch a use method; and in addition, in a transportation process, the base can be folded to reduce a packing size, thus being favorable for saving of a packing space and packing and transportation of the base.

Implementation, function characteristics and advantages of aims of the present application are further described in combination with embodiments with reference to the drawings.

DETAILED DESCRIPTION

It should be understood that specific embodiments described herein merely intend to explain the present application instead of limiting it.

The present application provides a television base.

Figure 1:
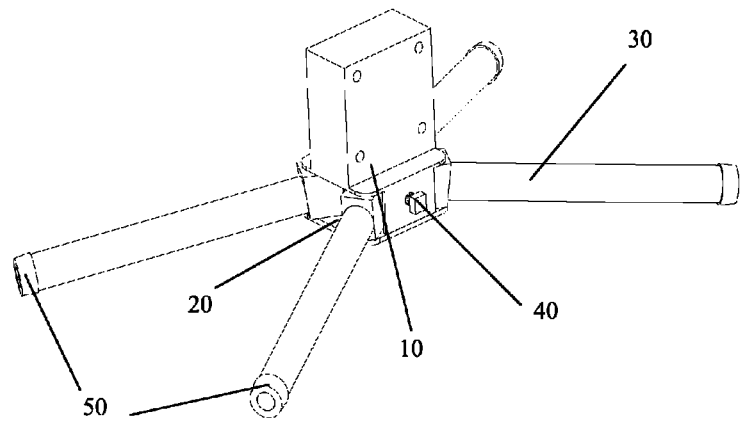
FIG. 1 is a structural schematic diagram when a television base according to the present application rotates to be opened.
Figure 2:
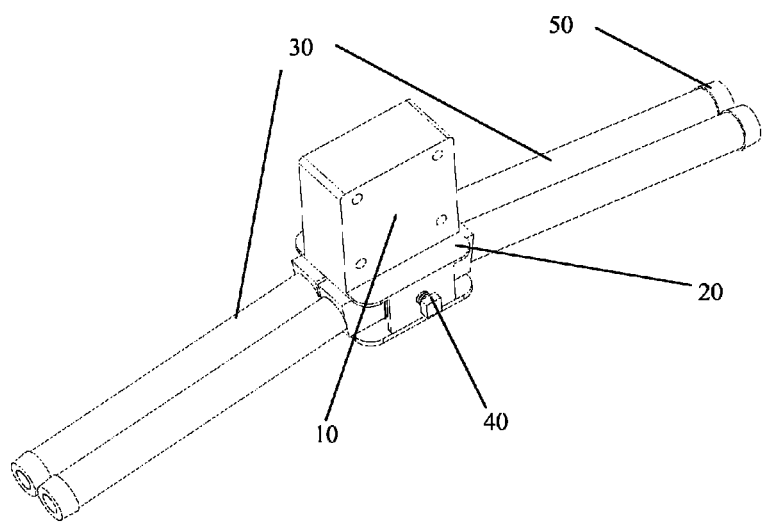
FIG. 2 is a structural schematic diagram when a television base according to the present application rotates to be folded.
Figure 3:
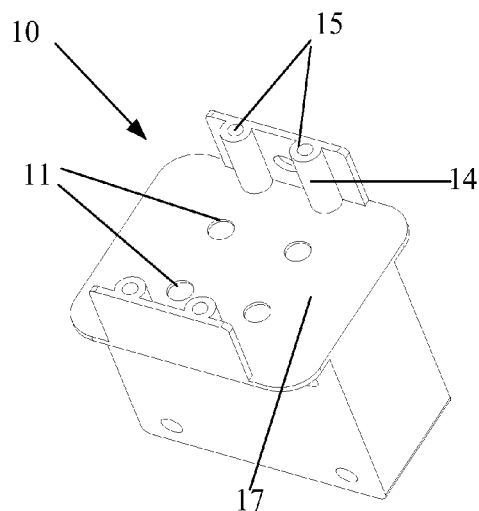
FIG. 3 is a structural schematic diagram of a supporting frame of a television base according to the present application.
Figure 4:
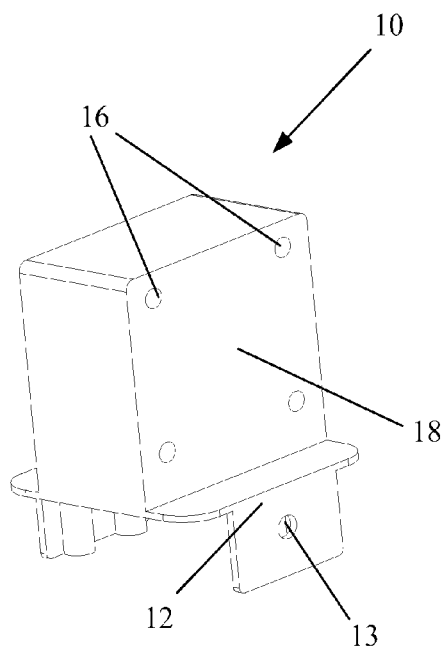
FIG. 4 is a structural schematic diagram from another angle of FIG. 3.
Figure 5:
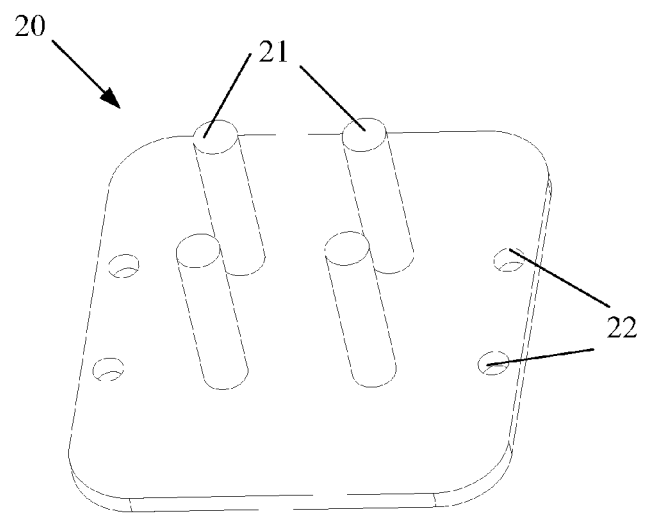
FIG. 5 is a structural schematic diagram of a bottom plate of a television base according to the present application.

With reference to FIG. 1-FIG. 5, FIG. 1 is a structural schematic diagram when a television base according to the present application rotates to be opened; FIG. 2 is a structural schematic diagram when a television base according to the present application rotates to be folded; FIG. 3 is a structural schematic diagram of a supporting frame 10 of a television base according to the present application; FIG. 4 is a structural schematic diagram of another angle of FIG. 3; and FIG. 5 is a structural schematic diagram of a bottom plate 20 of a television base according to the present application.

In an embodiment of the present application, the television base comprises a supporting base fixedly connected with a television shell, and at least three supporting rods 30 connected with the supporting base; a surface of the supporting base provided with rotating connection portions is in a first plane, the first plane is perpendicular to a plane where the television display screen (not shown in the drawing) is located, and the first plane in the present embodiment is a plane where fixing shafts 21 arranged on the bottom plate 20 are located hereinafter.

All the supporting rods 30 relatively rotate around the supporting base in the first plane, so that the supporting rods 30 are in a rotary opening state or in a rotary folding state, when the supporting rods 30 rotate to be opened, the supporting rods 30 are positioned in the first plane to support the television shell; and when the supporting rods 30 rotate to be folded, the supporting rods 30 are positioned in the first plane and are perpendicular to a plane where the television displays screen is located, wherein, when the supporting rods 30 are in the rotary opening state, the supporting rods 30 are radially distributed in the first plane, when the supporting rods 30 are in the rotary folding state, all the supporting rods 30 are positioned in the first plane, folded supporting rods 30 are positioned in two radial directions, as shown in FIG. 2, after all the supporting rods 30 are folded, the four supporting rods are folded into two supporting rods, and the two supporting rods 30 combined together are same in radial direction, the other two supporting rods 30 combined together are same in radial direction, in the present embodiment, the two directions are close to the same straight line, wherein the radial direction is a direction radially outwards by taking a circle center of a circumcircle of a quadrangle formed by the four fixing shafts 21 as a center.

Specifically, as shown in FIG. 1-FIG. 5, in the present embodiment, the supporting base comprises a supporting frame 10 and a bottom plate 20, the supporting frame 10 comprises a substrate 17, two supporting plates 12 and a connection portion 18; the substrate 17 is a rectangular plate, and the two supporting plates 12 are arranged perpendicular to the substrate 17 at two opposite sides of the substrate 17; the connection portion 18 is arranged at a surface of the substrate 17 deviated from the supporting plates 12. The bottom plate 20 is a rectangular plate matched with the substrate 17 in shape, and one surface of the bottom plate 20 away from the supporting plates 12 is a plane. The bottom plate 20 is fixedly connected with the supporting plates 12, and the substrate 17, the two supporting plates 12 and the bottom plate 20 form a containing space. One ends of the supporting rods 30 are arranged in the space while the other ends extend to the plane where the bottom plate 20 is located, the parts of the supporting rods 30 arranged in the containing space are hinged to the bottom plate 20, and the four supporting rods 30 can swing in a plane where the bottom plate 20 is relative to the containing space. The less of the supporting rods is located, the simpler the structure is located, the more of the supporting rods is located, the higher the stability is located, but the structure is more complex, the preferable number of the supporting rods in the present embodiment is four, and the structure is as simple as possible under the premise of ensuring stability and reliability of the base. During use, the four supporting rods 30 are supported open, and are radially arranged in a plane where the bottom plate 20 is by taking the containing space as a center, and two adjacent supporting rods 30 are arranged at an angle. When needing to suspend a flatscreen television on a wall, a user only needs to rotate the supporting rods 30 to combine two adjacent supporting rods 30, collect the four supporting rods 30 to be a plane, where a television display screen is located, below the television display screen.

Of course, in other embodiments, connection between the supporting rods 30 and the bottom plate 20 can be other movable connections, for example, a rotary shaft is arranged on the bottom plate 20 and the like and number of the supporting rods 30 can be three, four and so on.

In the present embodiment, the supporting rods 30 are arranged in a manner being capable of swinging relative to the supporting base, so that the plurality of supporting rods can be folded together, therefore, when a user needs to suspend the flatscreen television onto a wall, no detaching of the base is required, and it is favorable for the user to conveniently switch a use method; and in addition, in a transportation process, the base can be folded to reduce a packing size, thus being favorable for saving of a packing space and packing and transportation of the base.

Further, one ends of all supporting rods 30 away from the supporting base are positioned in the same plane, which is positioned below the supporting base, an interval exists between the supporting base and the plane, and the supporting rods support a television shell.

Specifically, in the present embodiment, the supporting base is arranged on a desktop, the supporting rods 30 contact with the desktop, so that the desktop is a support surface of the supporting base. One ends of the four supporting rods 30 are arranged in a swing manner together with the supporting base while the other ends are positioned in the same plane, namely, only four ends of the supporting rods 30 away from the supporting base contact with the support surface, the supporting rods 30 achieve a support action for a display screen of a flatscreen television. In other embodiments, of course, bending parts can be arranged on the supporting rods 30, and the display screen of the television is supported by only the four supporting rods 30.

In the present embodiment, the supporting rods 30 are arranged in a manner being capable of swinging relative to the supporting base, so that the plurality of supporting rods can be folded together, therefore, when a user needs to suspend the flatscreen television onto a wall, no detaching of the base is required, and it is favorable for the user to conveniently switch a use method.

Further, one ends of all supporting rods 30 away from the supporting base are positioned in the same plane, the bottom surface of the supporting base is positioned in the plane, and the bottom surface of the supporting base and the supporting rods 30 support the television shell together.

Specifically, one ends of the four supporting rods 30 are arranged in a swing manner together with the supporting base while the other ends are positioned in the same plane, the supporting rods 30 and the bottom plate 20 of the supporting plate are in the same plane and both contact with the support surface. At the moment, the four supporting rods 30 and the supporting base achieve a support action to the television shell at the same time.

In the present embodiment, the supporting rods 30 are arranged in a manner being capable of swinging relative to the supporting base, so that the plurality of supporting rods can be folded together, therefore, when a user needs to suspend the flatscreen television onto a wall, no detaching of the base is required, and it is favorable for the user to conveniently switch a use method.

Figure 6:
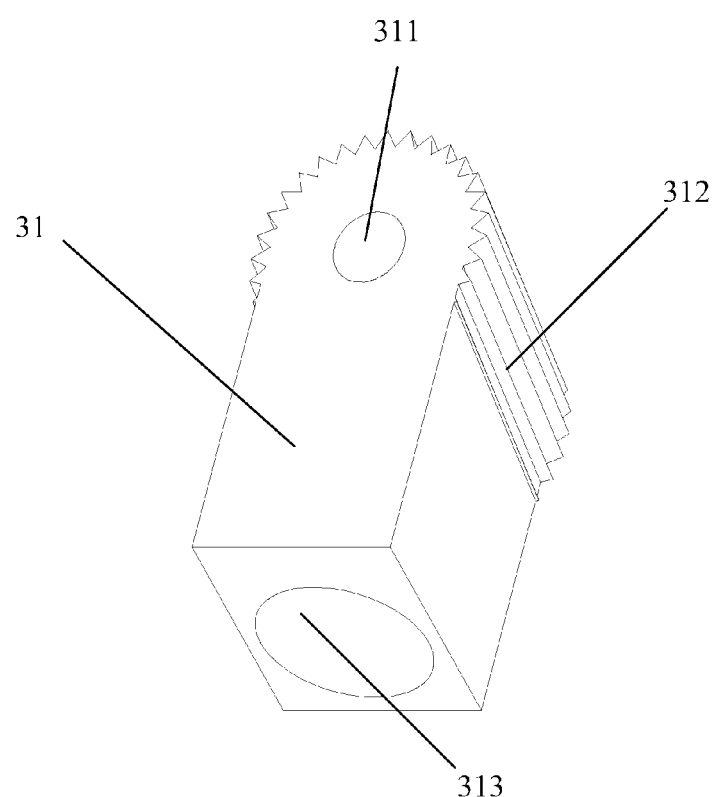
FIG. 6 is a structural schematic diagram of a connector of one supporting rod of a television base according to the present application.
Figure 7:
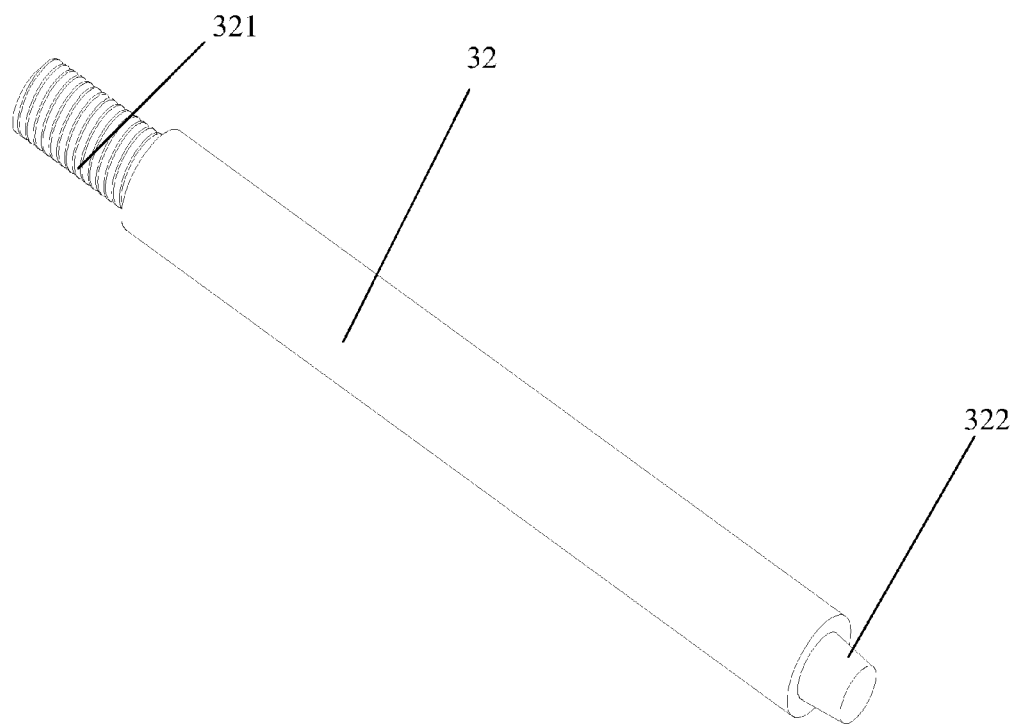
FIG. 7 is a structural schematic diagram of a strut of one supporting rod of a television base according to the present application.
Figure 9:
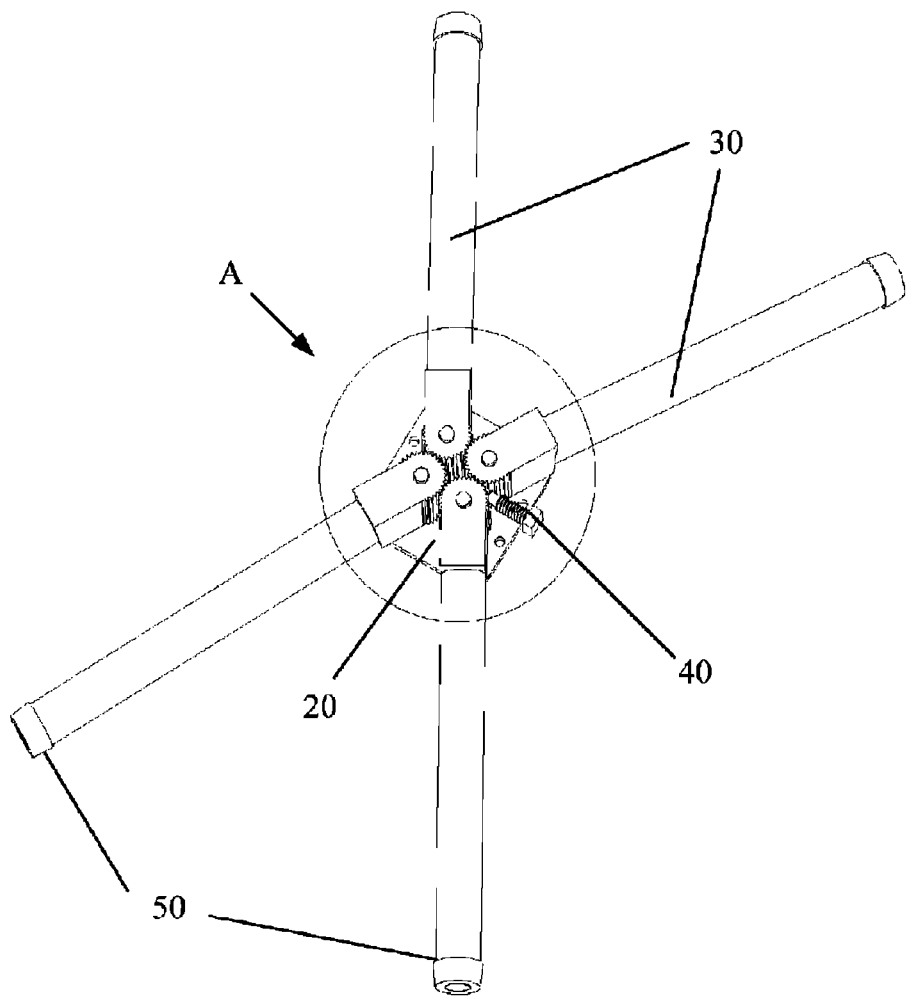
FIG. 9 is a structural schematic diagram after a supporting frame is detached from a television base according to the present application.

Further, with reference to FIG. 6, FIG. 7 and FIG. 9, FIG. 6 is a structural schematic diagram of a connector 31 of one supporting rod 30 of a television base according to the present application; FIG. 7 is a structural schematic diagram of a strut 32 of one supporting rod 30 of a television base according to the present application; and FIG. 9 is a structural schematic diagram after a supporting frame 10 is detached from a television base according to the present application.

The supporting base comprises the supporting frame 10 and the bottom plate 20, the supporting frame 10 is positioned above the bottom plate 20, the supporting frame 10 is fixedly connected with the bottom plate 20, one ends of the supporting rods 30 connected with the supporting base are provided with through holes 311, the positions of the bottom plate 20 corresponding to the through holes 311 are provided with the rotating connection portions, and the rotating connection portions are fixing shafts 21 arranged in the through holes 31; positions of the supporting frame 10 facing one side of the bottom plate 20 and corresponding to the fixing shafts 21 are provided with fixing holes 11, and the fixing shafts 21 penetrate through the through holes 311 and are arranged in the fixing holes 11.

Specifically, as shown in FIG. 6, FIG. 7 and FIG. 9, in the present embodiment, the fixing holes 11 are blind holes, the four fixing shafts 21 are arranged on the plate surface of the bottom plate 20 facing the containing space in a rectangle manner, and the fixing shafts 21 and the base are integrally arranged. The fixing shafts 21 are cylinders, the part of each supporting rod 30 arranged in the containing space is provided with a through hole 311, the aperture of each through hole 311 is larger than or equal to the diameter of the corresponding fixing shaft 21, and the through holes 31 sleeve the fixing shafts 21. Since the fixing shafts 21 and the through holes 311 are in clearance fit, so that the supporting rods 30 can rotate by taking the fixing shafts as axes, and swing of the supporting rods 30 is realized. The positions of the substrate 17 corresponding to the fixing shafts 21 are provided with four blind holes 11, and the fixing shafts 21 penetrate through and are arranged in the blind holes 11, so that the supporting rods 30 are limited in the containing space without moving and can only swing around the fixing shafts 21.

In the present embodiment, the fixing shafts 21 penetrate through and are arranged in the blind holes 11, so that the four supporting rods 30 can stably reliably swing in a plane where the bottom plate 20 is located, and it is favorable for opening and folding of the supporting rods 30.

Further, with reference to FIG. 1 and FIG. 2, one ends of all supporting rods 30 deviated from the supporting base are positioned in the same horizontal plane.

Specifically, as shown in FIG. 1 and FIG. 2, in the present embodiment, one ends of the supporting rods 30 are rationally connected with the fixing shafts 21 while the other ends extend to a direction away from the fixing shafts 21. The number of the supporting rods 30 is preferably four, one ends outwards extending of the four supporting rods 30 extend to the same horizontal plane, namely, the four supporting rods 30 can support in the same horizontal plane.

In the present embodiment, one ends outwards extending of the four supporting rods 30 are arranged in the same horizontal plane, so the supporting base supported by the four supporting rods 30 is horizontal, a display screen of the flatscreen television can be horizontally arranged and it is favorable for stability of the flatscreen television.

Figure 10:
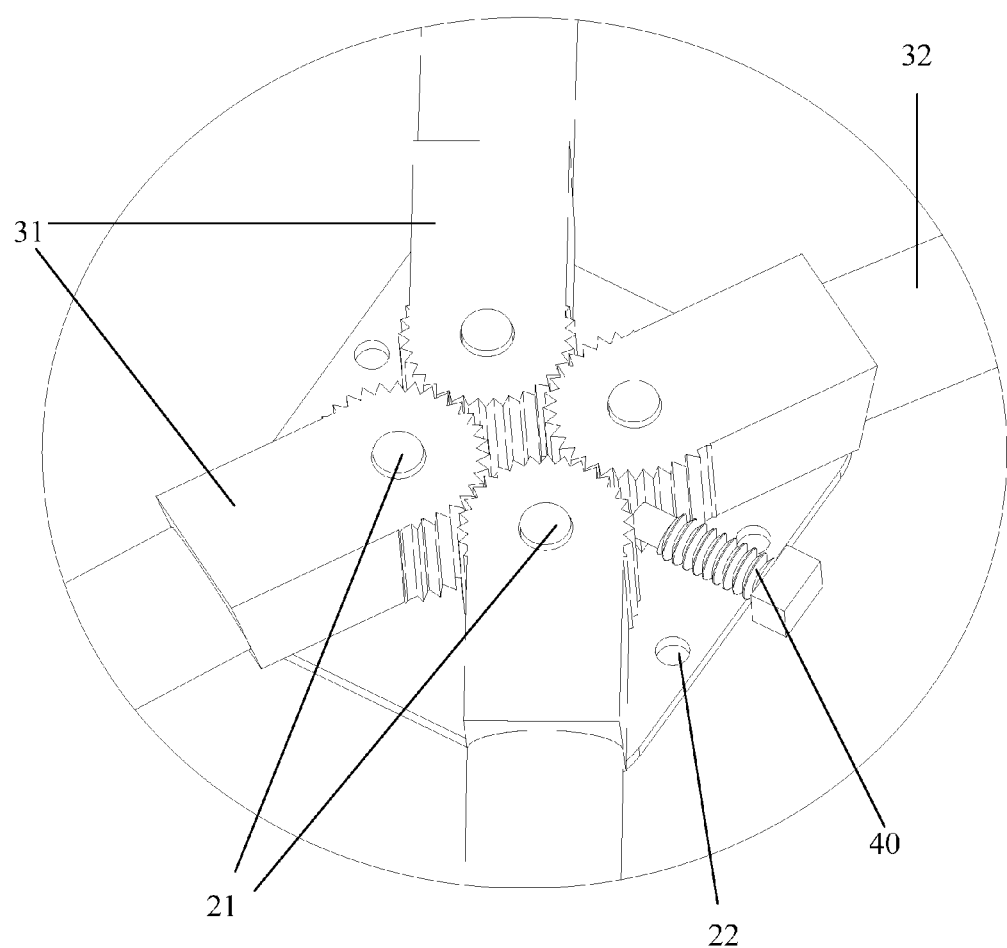
FIG. 10 is a magnified structural schematic diagram of an A position in FIG. 9.

Further, with reference to FIG. 6, FIG. 9 and FIG. 10, FIG. 9 is a structural schematic diagram after a supporting frame 10 is detached from a television base according to the present application, and FIG. 10 is a magnified structural schematic diagram of an A position in FIG. 9.

One ends of the supporting rods 30 connected with the supporting base are provided with teeth 312, and the teeth 312 of two adjacent supporting rods 30 can be meshed with each other, and when the number of the supporting rods 30 is four, the teeth of two adjacent supporting rods 30 are meshed with each other; when the number of the supporting rods 30 is three, the teeth 312 of one supporting rod 30 are meshed with the teeth 312 of the other two supporting rods 30 and the teeth of the other two supporting rods 30 are separated.

Specifically, as shown in FIG. 1, FIG. 2 and FIG. 6, in the present embodiment, one ends of the supporting rods 30 in the containing space are arcs, the arcs and transverse sections of the through holes 311 are concentric, the side walls of the arcs are provided with the teeth 312, which are uniformly arrayed on the arcs, and the arc part of each supporting rod 30 provided with the teeth 312 is equivalent to a half of gear. In order to reduce noise and vibration of the small teeth 312 in a meshing and transmission process, the teeth 312 are preferably bevel teeth 312, then the arc part of each supporting rod 30 is equivalent to a half of bevel gear. When the number of the supporting rods 30 is four, in the four supporting rods 30, the teeth 312 on two adjacent arc parts are meshed with each other. At the moment, if one of the four supporting rods 30 rotates, the other three supporting rods 30 swing due to meshing of the teeth 312. When the number of the supporting rods is three, in the three supporting rods 30, the teeth of one support 30 are meshed with the teeth 312 of the other two supporting rods 30 at the same time, because three gears cannot rotate in meshing, the supporting rods 30 are inconvenient to collect, and the teeth 312 of the other two supporting rods 30 are separately arranged necessarily.

Of course, in other embodiments, the teeth 312 are not merely limited to bevel teeth 312, and other teeth in transmission 312 can also realize mutual transmission among the supporting rods 30.

In the present embodiment, the teeth 312 are arranged at one ends of the supporting rods 30, and the supporting rods 30 can mutually drive due to meshing of the teeth 312, so that it is favorable to adjust angles among the supporting rods 30; and moving of single supporting rods 30 is limited and stability of the base is improved.

Further, with reference to FIG. 1, FIG. 2, FIG. 9 and FIG. 10, the television base further comprises a positioning pin 40, a supporting plate 12 extends in a direction on the supporting frame 10 toward the bottom plate 20, the supporting plate 12 is provided with a mounting hole 13, and the positioning pin 40 can extend between the two adjacent teeth 312 through the mounting hole.

Specifically, as shown in FIG. 1, FIG. 2, FIG. 9 and FIG. 10, in the present embodiment, the positioning pin 40 is a positioning knob, the position of the supporting plate corresponding to the meshing of the teeth 312 is provided with the mounting hole 13 penetrating through the supporting plate 12. When a user uses the base, after the angle among the supporting rods 30 is adjusted, the positioning knob 40 is arranged at the meshing position of the teeth 312 through the mounting hole 13, at the moment, since the meshing position of the teeth 312 is blocked, the supporting rods 30 cannot swing and move relative to one another, and the relative positions of the supporting rods 30 are limited. Similarly, when the user needs to collect the supporting rods 30, after the user collect the four supporting rods 30, the positioning knob 40 is reinserted to limit relative positions among the supporting rods 30.

In the present embodiment, by arranging the positioning knob 40, relative positions among the supporting rods 30 can be stable after adjusting, thus being favorable for improving stability of the supporting rods 30 and stability of the base.

Further, with reference to FIG. 4, FIG. 9 and FIG. 10, the positioning knob 40 is a screw and the mounting hole 13 is a first threaded hole matched with the screw.

Specifically, as shown in FIG. 9 and FIG. 10, in the present embodiment, the screw and the first threaded hole are in threaded connection, when a relation of relative positions among the supporting rods 30 needs to be adjusted, the screw is screwed outwards to move out of the meshing position of the teeth 312; after the relative positions among the supporting rods 30 are adjusted, the screw is screwed to move to the meshing position of the teeth 312.

In the present embodiment, the positioning knob 40 is set to be a screw, and the mounting hole 13 is set to be a first threaded hole, so that the positioning knob 40 cannot freely slide in the mounting hole 13, match between the positioning knob 40 and the mounting hole 13 is stable and reliable, relative positions among the supporting rods 30 are stable and reliable and it is favorable to improve stability of the base.

Further, with reference to FIG. 6 and FIG. 7, the supporting rod 30 comprises a strut 32 and a connector 31, the connector 31 is arranged in the containing space, and the connector 31 and the strut 32 are in threaded connection.

Specifically, as shown in FIG. 6 and FIG. 7, in the present embodiment, the supporting rod 30 comprises a strut 32 and a connector 31, the connector 31 is arranged in the containing space and connected with the fixing shaft 21, the adjacent connection surface of the connectors 31 is an arc surface provided with teeth 312, one end of the connector 31 connected with the strut 32 is rectangle, and second threaded hole 313 perpendicular to the through hole 311 is arranged at the middle position of the rectangle. The strut 32 is cylindrical, one end of the strut 32 provided with second threads 321 adaptive to the second threaded hole 313. One end of the strut 32 provided with the second thread 321 is in threaded connection with the second threaded hole 313.

In the present embodiment, the strut 32 and the connector 31 are in threaded connection, so that the connection between the strut 32 and the connector 31 is stable and reliable, the strut 32 and the connector 31 are detachable, and the strut 32 is favorably maintained, meanwhile, in a packing and transportation process, the strut 32 can be taken out for sorting and packing, and a packing space is reasonably favorably used.

Figure 8:
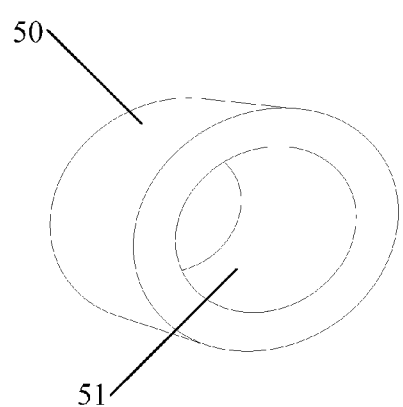
FIG. 8 is a structural schematic diagram of the foot pad of a television base according to the present application.

Further, with reference to FIG. 8, FIG. 9 and FIG. 10, FIG. 8 is a structural schematic diagram of one foot pad 50 of a television base according to the present application, and the base also comprises a foot pad for preventing sliding of the supporting rod 30, and the foot pad 50 is arranged at one end of the supporting rod 30 deviated from the connector 32.

Specifically, as shown in FIG. 8 and FIG. 9, in the present embodiment, one ends of the struts 32 away from the containing space are set as conical tables 322, the foot pad 50 is provided with a containing cavity 51 for containing the strut 32, and the containing cavities 51 and the conical tables 322 of the struts 32 are adaptive in shape.

In the present embodiment, the ends parts of the struts 32 are provided with foot pads 50, the friction force between the foot pads 50 and a support surface is larger than that between the struts 32 and the support surface, so that the struts 32 do not slide easily on the support surface and stability of the base is favorably improved.

Further, with reference to FIG. 3 and FIG. 5, the bottom plate 20 and the supporting frame 10 are detachably connected.

Specifically, as shown in FIG. 3 and FIG. 5, in the present embodiment, the inside wall of the containing space on the plate surface of the supporting plate 12 facing the containing space is provided with cylindrical mounting columns 14, and the mounting columns 14 are provided with third threaded holes 15 along the height direction. Each supporting plate 12 is provided with two mounting columns 14. The positions of the bottom plate 20 corresponding to the mounting columns 14 are provided with four connection holes 22, screws penetrate through the connection holes 22 and are arranged in the third threaded holes 15 to realize fixing between the bottom plate 20 and the supporting frame 10.

Of course, in other embodiments, buckles can be arranged at corresponding positions of the bottom plate 20 and the supporting frame 10, causing the bottom plate 20 and the supporting frame 10 to be in buckle connection.

In the present embodiment, the bottom plate 20 and the supporting frame 10 are arranged to be in threaded connection, so the bottom plate 20 and the supporting frame 10 are stably and reliably connected and are convenient to detach, and it is favorable for mounting and detaching the base and maintaining the base.

Further, with reference to FIG. 3 and FIG. 4, the supporting frame 10 further comprises a connection portion 18 for fixing a television display screen (the display screen comprises a shell fixing the display screen), and the connection portion 18 and the television shell are in threaded connection.

Specifically, as shown in FIG. 3 and FIG. 4, in the present embodiment, a cuboid connection portion 18 is arranged on the plate surface of the substrate 17 of the supporting frame deviated from the containing space, four fourth threaded holes 16 are uniformly arranged at the side surface of the connection portion 18, and the display screen of the television is fixedly connected with the connection portion 18 by the threaded holes.

Of course, in other embodiments, the connection manner between the connection portion 18 and the display screen can be other convenient-to-detach connection manners such as buckle connection.

In the present embodiment, the fourth threaded holes 16 are arranged on the connection portion 18, so the connection between the base and the display screen is stable, reliable, easy to detach and favorable for replacing and maintaining the base and using the television.

The present application further provides a flatscreen television.

In the present embodiment, the flatscreen television comprises a television base, of which the structure refers to above embodiments, and is not repeated herein.

In the present embodiment, the supporting rods are arranged in a manner being capable of swinging relative to the supporting base, so that the plurality of supporting rods can be folded together, therefore, when a user needs to suspend the flatscreen television onto a wall, no detaching of the base is required, and it is favorable for the user to conveniently switch a use method; and in addition, in a transportation process, the base can be folded to reduce a packing size, thus being favorable for saving of a packing space and packing and transportation of the base.

Above is merely preferable embodiments of the present application, and does not intend to limit a patent scope of the present application, and all equivalent structures or equivalent flow transformations made by using content in the description and drawings of the present application, or the present application directly or indirectly used in other related technical fields fall into a patent protection scope of the present application similarly.

What is claimed is:

1. A television base, comprising a supporting base fixedly connected with a television display screen and at least three supporting rods; wherein the supporting base comprises rotating connection portions, the supporting rods are rotationally connected with the rotating connection portions, a surface of the supporting base provided with the rotating connection portions is located in a first plane, and the first plane is perpendicular to a second plane where the television display screen is located;

all the supporting rods relatively rotate around the supporting base in the first plane, so that the supporting rods are in a rotary opening state or in a rotary folding state, when the supporting rods rotate to be opened, the supporting rods are positioned in the first plane to support a television shell; and when the supporting rods rotate to be folded, the supporting rods are positioned in the first plane and are perpendicular to the second plane where the television displays screen is located.

2. The television base according to claim 1, wherein the supporting base comprises a supporting frame and a bottom plate, the supporting frame is positioned above the bottom plate, the supporting frame is fixedly connected with the bottom plate, one ends of the supporting rods connected with the supporting base are provided with through holes, positions of the bottom plate corresponding to the through holes are provided with the rotating connection portions, and the rotating connection portions are fixing shafts arranged in the through holes.

3. The television base according to claim 2, wherein positions of the supporting frame facing one side of the bottom plate and corresponding to the fixing shafts are provided with fixing holes, and the fixing shafts penetrate through the through holes and are arranged in the fixing holes.

4. The television base according to claim 1, wherein each supporting rod comprises a strut and a connector, and the strut and the connector are in threaded connection.

5. The television base according to claim 4, further comprising a foot pad for preventing sliding of the supporting rod, and the foot pad is arranged at one end of the supporting rod deviated from the connector.

6. The television base according to claim 1, wherein one end of the supporting rod connected with the supporting base is provided with teeth, and when a number of the supporting rods is four, the teeth of two adjacent supporting rods are meshed with each other.

7. The television base according to claim 6, further comprising a positioning pin, wherein a supporting plate extends in a direction on the supporting frame toward the bottom plate, the supporting plate is provided with a mounting hole, and the positioning pin can extend between the two adjacent teeth through the mounting hole.

8. The television base according to claim 1, wherein one end of the supporting rod connected with the supporting base is provided with teeth, and when a number of the supporting rods is three, the teeth of one supporting rod are meshed with the teeth of the other two supporting rods and the teeth of the other two supporting rods are separated.

9. The television base according to claim 8, further comprising a positioning pin, wherein a supporting plate extends in a direction on the supporting frame toward the bottom plate, the supporting plate is provided with a mounting hole, and the positioning pin can extend between the two adjacent teeth through the mounting hole.

10. The television base according to claim 1, wherein the supporting frame further comprises a connection portion for fixing a television shell, and the connection portion and the television shell are in threaded connection.

11. A flatscreen television, comprising a television base, wherein the television base comprises a supporting base fixedly connected with a television display screen and at least three supporting rods; the supporting base comprises rotating connection portions, the supporting rods are rotationally connected with the rotating connection portions, a surface of the supporting base provided with the rotating connection portions is located in a first plane, and the first plane is perpendicular to a second plane where the television display screen is located;
all the supporting rods relatively rotate around the supporting base in the first plane, so that the supporting rods are in a rotary opening state or in a rotary folding state, when the supporting rods rotate to be opened, the supporting rods are positioned in the first plane to support a television shell; and when the supporting rods rotate to be folded, the supporting rods are positioned in the first plane and are perpendicular to the second plane where the television displays screen is located.

12. The flatscreen television according to claim 11, wherein the supporting base comprises a supporting frame and a bottom plate, the supporting frame is positioned above the bottom plate, the supporting frame is fixedly connected with the bottom plate, one ends of the supporting rods connected with the supporting base are provided with through holes, positions of the bottom plate corresponding to the through holes are provided with the rotating connection portions, and the rotating connection portions are fixing shafts arranged in the through holes.

13. The flatscreen television according to claim 12, wherein positions of the supporting frame facing one side of the bottom plate and corresponding to the fixing shafts are provided with fixing holes, and the fixing shafts penetrate through the through holes and are arranged in the fixing holes.

14. The flatscreen television according to claim 11, wherein each supporting rod comprises a strut and a connector, and the strut and the connector are in threaded connection.

15. The flatscreen television according to claim 14, wherein the television base further comprises a foot pad for preventing sliding of the supporting rod, and the foot pad is arranged at one end of the supporting rod deviated from the connector.

16. The flatscreen television according to claim 11, wherein one end of the supporting rod connected with the supporting base is provided with teeth, and when a number of the supporting rods is four, the teeth of two adjacent supporting rods are meshed with each other.

17. The flatscreen television according to claim 16, wherein the television base further comprises a positioning pin, a supporting plate extends in a direction on the supporting frame toward the bottom plate, the supporting plate is provided with a mounting hole, and the positioning pin can extend between the two adjacent teeth through the mounting hole.

18. The flatscreen television according to claim 11, wherein one end of the supporting rod connected with the supporting base is provided with teeth, and when a number of the supporting rods is three, the teeth of one supporting rod are meshed with the teeth of the other two supporting rods and the teeth of the other two supporting rods are separated.

19. The flatscreen television according to claim 18, wherein the television base further comprises a positioning pin, a supporting plate extends in a direction on the supporting frame toward the bottom plate, the supporting plate is provided with a mounting hole, and the positioning pin can extend between the two adjacent teeth through the mounting hole.

20. The flatscreen television according to claim 11, wherein the supporting frame further comprises a connection portion for fixing a television shell, and the connection portion and the television shell are in threaded connection.

* * * * *